March 5, 1957  S. ROBINS  2,783,730
DEVICE FOR ALERTING A MOTORIST TO VEHICLE SPEED
Filed Sept. 16, 1954  2 Sheets-Sheet 1
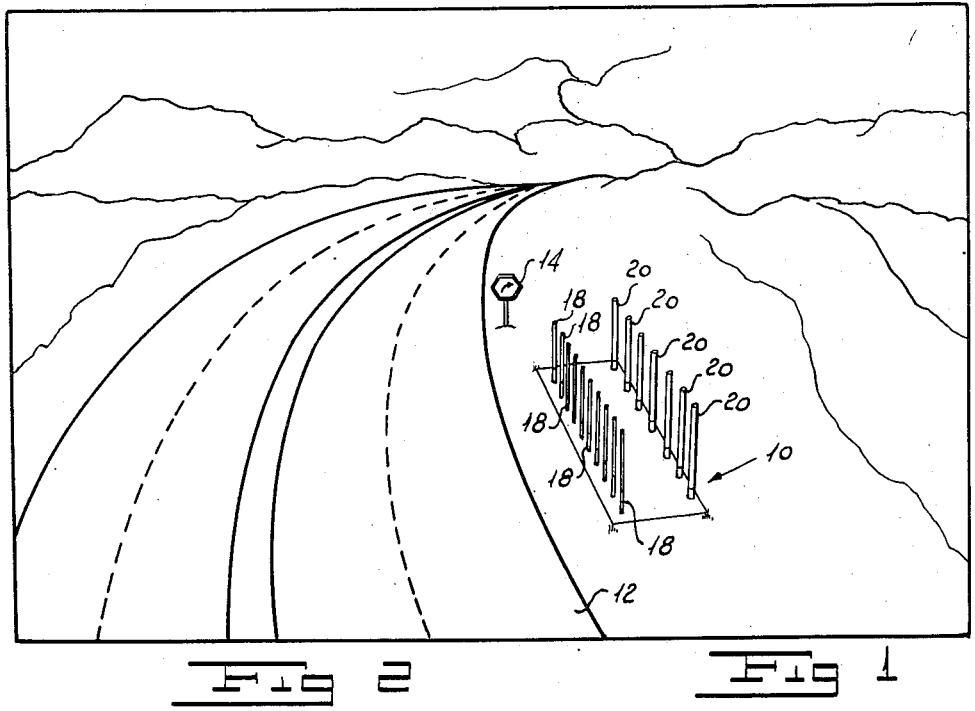
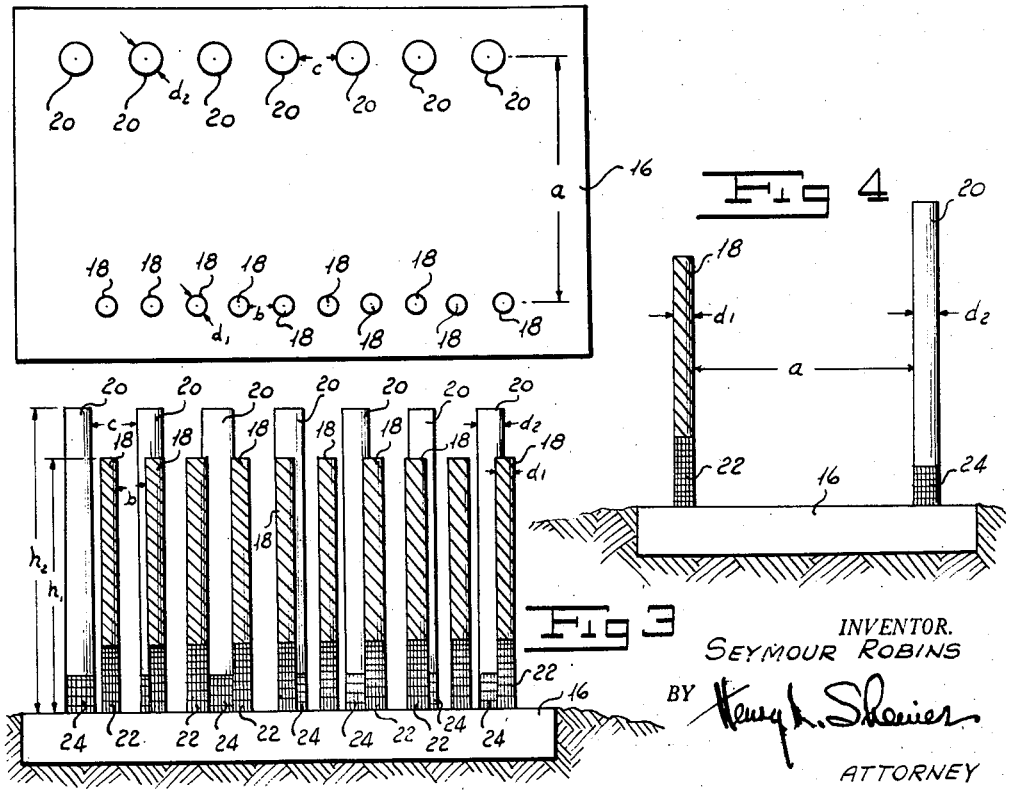
INVENTOR.
SEYMOUR ROBINS
BY
ATTORNEY March 5, 1957  S. ROBINS  2,783,730
DEVICE FOR ALERTING A MOTORIST TO VEHICLE SPEED
Filed Sept. 16, 1954  2 Sheets-Sheet 2

INVENTOR.
SEYMOUR ROBINS
BY
ATTORNEY

United States Patent Office 2,783,730
Patented Mar. 5, 1957

2,783,730

DEVICE FOR ALERTING A MOTORIST TO VEHICLE SPEED

Seymour Robins, New York, N. Y.

Application September 16, 1954, Serial No. 456,586

10 Claims. (Cl. 116—63)

My invention relates to a highway speed control device and more particularly to a highway speed control device which provides a motorist with a visual impression of the speed at which he is traveling and an awareness of his own motion relative to the surrounding terrain.

Modern super highways and turnpikes are the scene of many tragic and fatal accidents. It is well known that these accidents, for the most part, are the result of the excessive speeds at which motorists travel over the highways. Attempts on the part of traffic officials to curb the speeds at which the highways are traveled have taken the form of arbitrary speed limits and regulations. Motorists are informed of these limits and regulations, as well as of dangerous highway conditions, by signs posted along the highway. These signs are, however, informative only and do not afford the observer any sensation of speed. They may result in a conscious mental act on the part of the motorist in which he reasons that he should reduce speed. However, motorists tend to ignore these warnings because they give no direct impression of the danger occasioned by excessive speed. In order to interpret these warnings the motorist must refer to his speedometer or he must derive a sensation of speed from the natural surroundings of the highway. Modern turnpikes and super highways and the areas surrounding them are notoriously bare of objects which would provide the motorist with a sensation of speed. One of the criticisms which has been leveled at such highways is that they hypnotize the driver of an automobile to a point where he loses his normal alertness. The situation may be likened to that of an aircraft passenger who is concentrating on a cloudless sky. He receives no sensation of speed but must refer to the earth before any such sensation results. On the modern super highways the motorist has no convenient means by which he can accurately gauge his speed or the potential effects thereof; yet he is required to conform to arbitrary speed limits. He may actually be driving at an excessive rate without even being aware of it. It is desirable that some speed warning device be provided which awakens the instinct of self-preservation in the driver to cause him to reduce his speed to below a safe limit for his own capabilities and reactions with respect to his own condition under the particular circumstances at that particular time.

It is to be noted further that the human faculties of perception, action, reaction, and decision differ from person to person. What may be a safe speed for one individual is not a safe speed for another. The arbitrary speed limit ignores these differences between individuals. It is desirable that some means be provided for giving each driver an impression or sensation of high speed when he is traveling at a rate which may be dangerous for him.

It is well known that human beings instinctively or subconsciously take purposeful action in response to outside stimuli. The action taken by an individual in response to a stimulus is the result of past experience under similar conditions. I have invented a highway speed control device which creates a sensation of speed in a motorist giving him a visual impression of speed. This device depends for its functioning on the instinctive reaction based on past experience of an individual with relation to size, distance, overlay, and parallax. My device provides a means for controlling the speed at which the operator of a motor vehicle drives by awakening his instinct of self-preservation.

One object of my invention is to provide a highway speed control device which affords a motorist a sensation or impression of speed.

Another object of my invention is to provide a highway speed control device which creates an impression of speed to awaken the instinct for self-preservation in a speeding motorist.

A further object of my invention is to provide a highway speed control device which functions positively to create an impression of speed to cause an individual motorist to reduce speed when he is traveling at a rate which he instinctively knows by experience is dangerous for him.

Other and further objects of my invention will appear from the following description.

In general my invention contemplates the provision of a pair of rows of generally similar objects arranged along the side of the highway or the like in connection with which my device is to be employed. The objects of each row are spaced one from another by a selected distance, and the inter-row spacing is such that motion parallax makes the objects of the row adjacent the highway appear to an observer to pass in front of the objects of the row remote from the highway as an observer passes the device. The arrangement is such that the overlay rate, or rate at which an object of the first row adjacent the highway appears to pass in front of the objects of the row remote from the highway, is great. The apparent change in position of the objects of the first row with respect to those of the second row resulting from the actual change of the observer's position with respect to the objects, gives the motorist some sensation of the speed at which he is traveling. Taken by itself this impression of speed is no more than would result from naturally placed objects disposed in a manner similar to my objects. However, I enhance this sensation of speed by making use of certain laws of visual perception in my device. The objects of the row adjacent the highway are smaller, are placed closer together, and are darker than the objects of the row remote from the highway. As will be explained hereinafter in detail this arrangement creates an impression on the part of the motorist that the rows, which are separated by a large enough distance to have a high overlay rate, are closer than they are in reality. That is, the motorist receives the impression that he is observing two distant rows of objects which are close together and yet which have a high overlay rate resulting from motion parallax. It will be appreciated that if the motorist receives an impression that the rows are distant and close together and yet have a high overlay rate, he will receive a sensation that he is traveling at a high speed. His instinctive reaction to this sensation is a tendency to reduce speed.

In the accompanying drawings which form part of the instant specification and which are to be read in conjunction therewith and in which like reference numerals are used to indicate like parts in the various views:

Figure 1 is a perspective view of a highway speed control device, embodying one form of my invention, in use alongside a highway.

Figure 2 is a top plan view, on an enlarged scale, of the form of my highway speed control device shown in Figure 1.

Figure 3 is a front elevation, on an enlarged scale, of the form of my highway speed control device shown in Figure 1.

Figure 4 is a side elevation, drawn on an enlarged scale, of the form of my highway speed control device shown in Figure 1.

Figure 5:
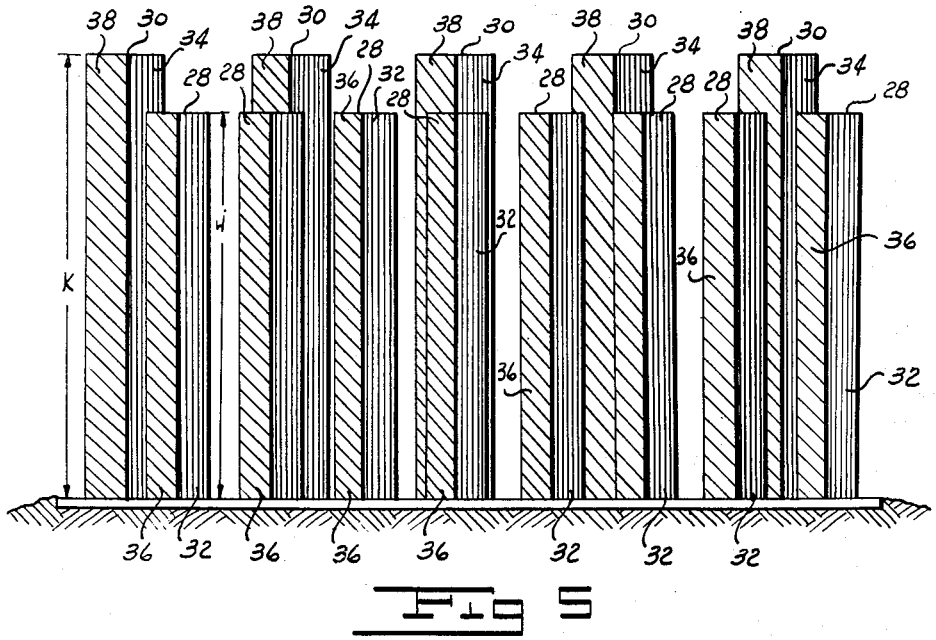
Figure 5 is a front elevation of another form of my highway speed control device.

As has been explained generally hereinabove, the sensations resulting from visual perceptions are the product of experience which leads us to make assumptions about the nature and characteristics of the objects we see. The instinctive reactions occasioned by these sensations also are the result of past experience with similar sensations. Because of motion parallax, an observer traveling past a pair of spaced rows of objects receives the impression that the objects of the front row, or row closer to the observer, are traveling past the objects of the rear row, or row remote from the observer that; is, there is an apparent movement of the objects of the front row with respect to the objects of the rear row which results from the actual motion of the observer past the rows. The rate at which an object of the front row appears to pass the objects of the rear row may be termed the overlay rate. This overlay rate is directly related to the impression of speed given the observer as he passes by the rows. Investigation has shown that a number of general propositions may be formulated with respect to visual perceptions. Some of these propositions are:

(1) The greater the distance of separation between a front and a rear row of objects, the greater is the overlay rate and sensation of speed gained by an observer passing by the rows.

(2) A corollary of the first proposition is that the closer the front row is to the observer as he travels along the row, the greater is the received speed sensation.

(3) Similar objects of the same apparent size and shape are classified by an observer as being at the same distance from the observer.

(4) Larger appearing objects of a similar nature to apparently smaller like objects are classified by an observer as being nearer than the smaller objects.

(5) As a corollary to proposition (4), smaller appearing objects of a similar nature to larger appearing objects are classified as being further from the observer than are the larger objects.

(6) Objects which appear brighter, though of a similar nature in other respects to other objects, are classified as being closer to an observer.

(7) Objects which appear darker, though of a similar nature in other respects to other objects, are classified as being further away from an observer.

(8) A speed sensation is given an observer by the overlay rate together with the impression of closeness to each other of a pair of rows of objects.

More particularly referring now to Figure 1 of the drawings, the illustrated embodiment of my highway speed control device, indicated generally by the reference character 10, is arranged alongside the right-hand lane 12 of a super highway or the like. A short distance beyond my device 10 a sign 14, indicating a curve, is fixed. As can be seen by reference to Figures 1 to 4, my device 10 may conveniently include a base 16 in which is mounted a first row of objects 18. Also fixed in the base 16 is a second row of objects 20. While the objects 18 and 20 have been shown as cylindrical posts, it will readily be appreciated that any form of object may be employed which can be given the required characteristics, to be described hereinafter. The arrangement is such that the row of posts 18 is immediately adjacent the highway to form a front row of posts, as viewed by an observer traveling along the highway 12. Posts 20 form a rear row of posts which is spaced by a distance $a$ from the row of posts 18 in a direction away from the side of the highway 12. The distance $a$ is so selected that the posts 18 appear to pass relatively rapidly in front of the posts 20 of the rear row as an observer travels the highway 12. That is, the device provides a high overlay rate to a passing observer. The interpost spacing $b$ between posts 18 is is less than the interpost spacing $c$ between posts 20. This arrangement further increases the overlay rate. This rate creates an impression of speed in a motorist passing along the highway. While the posts 18 and 20 have been shown as being fixed in the base 16 which, in turn, is imbedded in the ground adjacent the side of the highway, it will readily be appreciated that posts 18 and 20 may be driven directly into the ground. If desired, the objects may be suspended above the ground from supports having a low visibility.

I have utilized the principles of visual perception further to enhance the sensation of speed created by posts 18 and 20. Conscious experience tells us that the overlay rate and the sensation of speed resulting therefrom increases as the distance $a$ increases. Consequently, if we view a pair of rows of posts which have a high overlay rate and yet which rows appear to be closely spaced, a sensation of high speed results. While the distance $a$ and the interpost spacings have been selected to provide a relatively high overlay rate, the principles of visual perception have been employed to create the impression that the row of posts 18 is closer to the row of posts 20 than the selected distance $a$. The overlay rate, taken by itself, creates the impression of a certain speed. However, the embodiment of the principles of visual perception in the posts 18 and 20 gives the sensation of a much higher rate of speed with this overlay rate. The diameter $d_1$ of the posts 18 is selected to be less than the diameter $d_2$ of the posts 20. From the principles of visual perception we know that larger objects at the same actual distance from the observer as similar smaller objects appear to be closer to the observer. The larger posts 20 of the rear row, therefore, appear to be closer to the observer than would smaller posts 18 at the same distance from the observer. Similarly, the smaller posts 18 of the front row appear further from the observer than would larger posts 20 if at the same distance from the observer. The over-all effect is that the respective front and rear rows of posts 18 and 20 appear to an observer to be closer together than the actual distance of separation $a$. This impression is heightened by the fact that the height $h_1$ of posts 18 is less than the height $h_2$ of the posts 20. To emphasize this difference in height of posts 18 and 20, the base 16 which are of a greater length than similar dark portions 24 of the posts 20 adjacent the base 16. I also utilize the principle of visual perception resulting from a difference in brightness of posts 18 from posts 20. The posts 18 may conveniently be painted some dark color such, for example, as green or the like, as indicated by the hatching in Figures 3 and 4, while the posts 20 may be white. Since brighter objects similar in other respects to other objects appear closer to an observer than do dark objects, the posts 20 will appear to an observer to be closer to the posts 18 than they actually are. Since posts 18, which are actually closer to the observer than the posts 20 are smaller and darker than posts 20 and since the posts 20 are behind posts 18, the observer receives the impression that both rows are far away and spaced close together. The fact that all posts appear far away leads the observer to believe that the interpost spacing of the rows is large where it actually is small.

The over-all result of the above-described construction and arrangement is an impression of high speed as a motorist passes by the rows of posts in traveling along the highway. The overlay rate provided by the separation $a$ between the rows of posts and the relative interpost spacings between posts 18 and between posts 20 creates an initial impression of speed. Because of the relative size between posts 18 and 20, and the relative brightness of the posts 18 and 20, the motorist receives a heightened impression of speed. If the only factor were the separation $a$ between the rows of posts, the motorist would only receive the impression of speed which he would expect from experience when passing so spaced rows of similar objects. However, by virtue of the described relative characteristics of the posts, he is led to believe that the rows of posts are closer together though they have a high overlay rate. Further, the motorist would expect a high overlay rate from a pair of rows of posts disposed immediately adjacent the highway. He is, however, led to believe that both rows are distant and yet have a high overlay rate. The impression of high speed is thus strengthened. Because he believes the rows to be distant, he judges the interpost spacing to be large, whereas it actually is small. That is, he thinks the high overlay rate is with respect to distant, closely spaced rows having large interpost spacings. Consequently, the motorist is given a sensation that he is traveling at a high rate of speed, and his instinctive reaction is to reduce his speed.

Figure 6:
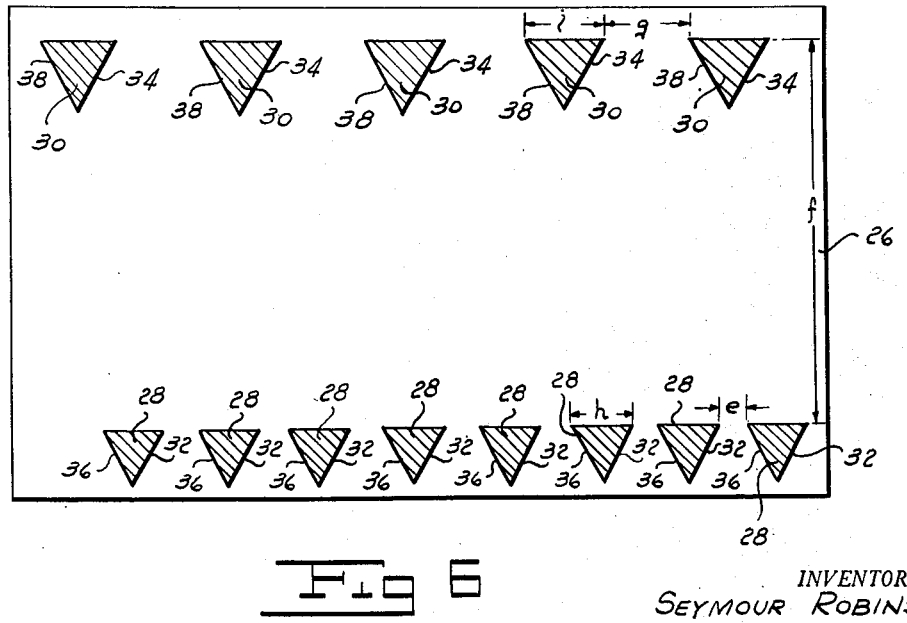
Figure 6 is a top plan view of the form of my highway speed control device shown in Figure 5.

Referring now to Figures 5 and 6, I have shown another form of my invention which embodies yet another principle of visual perception. This form of my invention includes a base 26 which may be imbedded in the ground adjacent the highway in the same manner as was the base 16. The posts 28 of the front row, which is the row disposed adjacent the highway, are triangular in cross section and are spaced one from the other at the bases thereof by a distance $e$. This front row of posts 28 is separated from a rear row of posts 30 by a distance $f$. The distance $f$ corresponds to the distance $a$ in the embodiment of my invention illustrated in Figures 1 to 4. The rear row of posts 30 are also triangular in cross section and are separated one from the other by a distance $g$. As was the case with the form of my invention shown in Figures 1 to 4, the distance $g$ between the rear row of posts is greater than the distance $e$ between the front row of posts. The front posts 28 have bases of a dimension $h$ which is less than the width $i$ of the bases of the rear posts 30. This is, the rear posts 30 are larger in cross section than are the front posts 28. The front posts 28 have a height $j$ which is less than the height $k$ of the rear posts 30. From the construction thus far described it will be seen that the form of my invention shown in Figures 5 and 6 is similar to that shown in Figures 1 to 4, with the exception that the posts 28 and 30 are of a triangular cross section rather than being cylindrical as are the posts 18 and 20. I have, however, in the embodiment of my invention shown in Figures 5 and 6, employed another principle of visual perception to heighten the impression of speed given a motorist as he passes by the rows of posts 28 and 30. As can be seen by reference to Figure 5, the sides 32 and 34 of the respective posts 28 and 30, which are viewed by an observer as he approaches the posts from the right, are of a selected color which may, for example, be red as indicated by the hatching in Figure 5. The other respective sides 36 and 38 of the posts 28 and 30, which are viewed by an observer after he passes by the posts, are painted a contrasting color to the sides 32 and 34. For example, sides 36 and 38 may be painted green, as indicated by the hatching in Figure 5. It will be appreciated that as an observer passes by the rows of posts 28 and 30, he receives the impression of a sudden change in color from red to green. This sudden change in color heightens the illusion of speed given a motorist as he flashes by the device.

In use my device may be employed to replace or supplement speed warning signs posted along the highway. For example, if the desired maximum speed on the highway is 30 M. P. H., the distance $a$ or $f$ which determines the overlay rate of the rows of posts 18 and 20 or 28 and 30 may be selected to give a driver such an impression of speed when he exceeds 30 M. P. H. that he instinctively reduces his speed. The speed for which the device is constructed may readily be varied by changing the distance of separation between rows of posts 18 and 20 or 28 and 30. This speed, or the corresponding impression created by the device, may also be varied by changing the relative size of posts 18 and 20 or 28 and 30, by varying the relative interpost spacing of the posts of the front and back row, or by varying the relative brightness of the front posts with respect to the rear posts. If the form of my invention shown in Figures 5 and 6 is employed, the impression of speed given a motorist may be heightened by providing a change in color as a motorist passes by the device. Conveniently also, my device may be arranged alongside the highway immediately preceding a curve. It can be arranged to create such an impression of speed that a motorist passing thereby will negotiate the curve at a safe speed. It will readily be appreciated that my device, which creates an instintive reaction to excessive speed, provides a much more effective speed control device than does a warning sign, such as the sign 14, which requires observation of a speedometer and a conscious mental act on the part of the motorist before he reacts to reduce speed. Moreover, many of these warning signs are ignored by motorists because no direct impression of speed is given. For example, a motorist may feel that 60 M. P. H. is a safe speed limit for him on a particular stretch of road. Highway officials may wish to limit speed for the highway to 30 M. P. H. This object may be conveniently and safely accomplished by employing my invention to create an awareness in the motorist that he is traveling as though he were going 60 M. P. H. when in truth he is traveling at a rate of 30 M. P. H.

It will be understood, of course, that light reflective means of any type known to the art may be employed on the surfaces of members 18 and 20 so that the device will continue to operate by reflected light at night. It will be further understood that members 18 and 20 may be lighted either by carried spaced lamps or by flood lights.

It will be seen that I have accomplished the objects of my invention. I have provided a highway speed control device which creates an instinctive reaction in the speeding motorist which causes him to reduce speed. My device makes use of the principles of visual perception to control speed on highways. It provides a motorist with a means for judging the safety of his speed according to his own individual past experiences. It does not necessitate a conscious mental act on the part of a motorist before he reduces speed.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A device for alerting a motorist to the speed of a motor vehicle on a highway including in combination a first object disposed adjacent the highway, a second object spaced by a selected distance from the first object in a direction away from the highway, said selected distance being such that the overlay rate of the first object with respect to the second object is high as the motorist travels along the highway past the device, said second object being larger than the first object whereby the motorist receives the impression that the second object is separated from the first object by a distance less than the selected distance.

2. A device for alerting a motorist to the speed of a motor vehicle on a highway including in combination a first object disposed adjacent the highway, a second object spaced by a selected distance from the first object in a direction away from the highway, said selected distance being such that the overlay rate of the first object with respect to the second object is high as the motorist travels along the highway past the device, said second object being of a lighter color than said first object.

3. A device for alerting a motorist to the speed of a motor vehicle on a highway including in combination a first row of objects arranged adjacent the highway generally in the direction thereof, a second row of objects arranged at a selected distance in a direction away from the highway from the first row of objects, said second row of objects extending in a direction generally parallel to the first row, said selected distance being such that the overlay rate of the objects of the first row with respect to those of the second row is high as the motorist travels along the highway, the objects of the second row being brighter than the objects of the first row whereby the motorist receives the impression that the second row is separated from the first row by a distance less than said selected distance.

4. A device for alerting a motorist to the speed of a motor vehicle on a highway including in combination a first row of objects arranged adjacent the highway generally in the direction thereof, a second row of objects arranged at a selected distance in a direction away from the highway from the first row of objects, said second row of objects extending in a direction generally parallel to the first row, said selected distance being such that the overlay rate of the objects of the first row with respect to those of the second row is high as the motorist travels along the highway, the objects of the second row being larger than the objects of the first row whereby the motorist receives the impression that the second row is separated from the first row by a distance less than said selected distance.

5. A device as in claim 4 wherein said objects are posts, the posts of said second row being taller than the posts of said first row.

6. A device as in claim 4 wherein said objects are posts, the posts of said second row being of a larger diameter than the posts of the first row.

7. A device as in claim 4 wherein the objects of said first row are darker than the objects of the second row.

8. A device as in claim 4 wherein said objects are posts having a triangular cross section, the arrangement of said posts being such that one side of each lies generally along the direction of the row in which the post is disposed, one of the remaining sides of each post being of a selected color and the other of the remaining sides of each post being of a color contrasting with said selected color, the arrangement being such that a motorist passing by the device views the sides of the posts which are painted said selected color as he approaches said device and the sides of the posts which are painted a contrasting color as he passes the device.

9. A highway speed control device as in claim 4 wherein the spacing between objects of said first row is less than the spacing between objects of the second row.

10. A device for alerting a motorist to the speed of a motor vehicle on a highway including in combination a first row of posts disposed adjacent the highway generally in the direction thereof, a second row of posts arranged at a selected distance in a direction away from the highway from the first row of posts, said second row of posts extending in a direction generally parallel to the first row, each of said posts being formed with a triangular cross section, each of said posts being arranged with one side thereof extending generally in the direction of the row in which it is disposed, one of the remaining sides of each post being of a selected color, the other of the remaining sides of each post being of a color contrasting with the selected color, the arrangement being such that a motorist views said sides of the selected color as he approaches the device and the sides of the contrasting color as he passes the device.

References Cited in the file of this patent

FOREIGN PATENTS 106,866     Great Britain  ----------- June 14, 1917